UNITED STATES PATENT OFFICE.

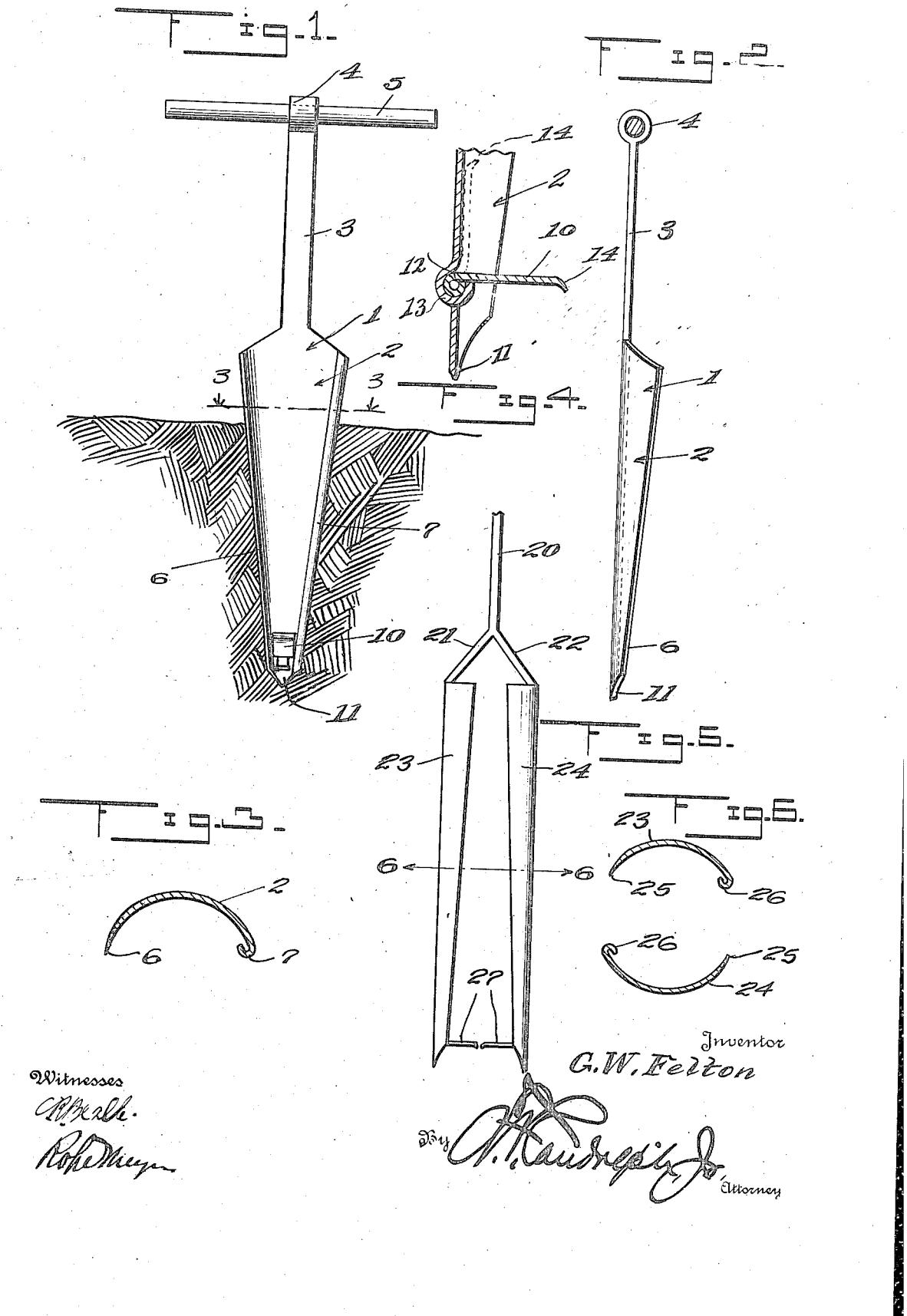

GEORGE W. FELTON, OF ELM SPRINGS, SOUTH DAKOTA.

POST-SPADE.

1,306,807.      Specification of Letters Patent.      Patented June 17, 1919.

Application filed October 26, 1917. Serial No. 198,656.

*To all whom it may concern:*

Be it known that I, GEORGE W. FELTON, a citizen of the United States, residing at Elm Springs, in the county of Meade and State of South Dakota, have invented certain new and useful Improvements in Post-Spades; and I do hereby declare the following to be a full, clear, and exact description of the invention, such as will enable others skilled in the art to which it appertains to make and use the same.

This invention relates to a spade or to a tool which is particularly designed for digging post holes and the primary object of the invention is to provide a spade which may be driven into the ground, by the use of a sledge hammer, maul or the like, and after it has been driven into the ground, turned about a circle, for cutting out a piece of soil to form a post hole into which a pointed post may be driven or a blunt end post tamped.

More specifically, the object of this invention is to provide a spade or tool as specified which includes a blade that is arcuate in cross section and has one edge sharpened to cut through the soil or dirt and the other edge rolled to loosen the dirt as the spade is turned around in the ground, for cutting loose or free the dirt to be removed and further to provide a lifter which is hingedly connected to the blade near the bottom of the same and lies in engagement with inner surfaces of the blade when the latter is being forced into ground, but when the tool and the loosened dirt are moved upwardly, the lifter will assume a horizontal position and form a support for the dirt, thereby facilitating the removal of the dirt from the hole.

With the foregoing and other objects in view this invention consists in such novel features of construction, combination and arrangement of parts as will be hereinafter more fully described, illustrated in the accompanying drawings and claims.

In describing the invention in detail, reference will be had to the accompanying drawings wherein like characters designate like and corresponding parts throughout the several views, and in which:

Figure 1 is a front elevation of the improved tool showing the same inserted in the ground, Fig. 2 is a side elevation of the tool, Fig. 3 is a horizontal section on the line 3—3 of Fig. 1, Fig. 4 is a fragmentary vertical section showing the dirt lifter in an operative position, Fig. 5 is a side elevation of a modified form of the post spade, and Fig. 6 is a section on the line 6—6 of Fig. 5.

Referring more particularly to the drawings, 1 designates the post spade as an entirety, which is preferably formed of a single sheet of metal, and has a blade 2, upwardly from the upper end of which a shank 3 projects. The shank 3 has an eye 4 formed upon its upper end to receive a bar 5. The bar 5 is provided for facilitating the turning of the spade after it has been inserted into the ground.

The blade 2 of the spade is arcuate in cross section, and one has its edge 6 sharpened while its opposite edge 7 is rolled. The sharpened edge 6 is provided for cutting the soil or dirt as the tool or spade is rotated, and the rolled edge 7 loosens the dirt, in such a manner that it may be easily removed from the hole when the spade is moved outwardly. The preferred form of the spade is illustrated in Figs. 1, 2, 3 and 4, the blade has its sides tapering, inwardly or converging, as they extend downwardly to provide a substantially triangularly shaped inserting plate which is driven into the ground. The substantially triangularly shaped plate, will cut a conical hole in the ground, into which a pointed post may be driven and it will also facilitate the removal of the dirt from the hole, in that when the spade is pulled upwardly, the dirt will not rub on the sides of the hole, and therefore will not fall or rub off the spade, owing to the fact that the hole increases in size or diameter as it extends upwardly.

A dirt lifter 10 is carried by the blade 2 near its lower pointed end 11. This lifter comprises a plate which has its inner end rolled as shown at 12 to form an eye which is loosely mounted in a pocket 13 formed in the blade 2. A portion of the blade is partly severed and forms a pocket or sleeve 13 for the reception of the eye 12. The forward end of the member 13 extends beneath the lifter 10 and functions as a stop element. The upper or free end of the plate 10 is curved outwardly, as shown at 14, so that when the spade is moved upwardly, the dirt will engage the upper outwardly curved end of the plate 10 and move this plate downwardly into a horizontal dirt supporting position.

In Figs. 5 and 6, a modified form of the invention is illustrated. This modified form comprises a shank 20 which has its lower end forked, forming arms 21 and 22. Blades 23 and 24 are connected to the lower ends of the arms 21 and 22. The blades 23 and 24 are arcuate in cross section and each has one vertical edge 25 sharpened for cutting the dirt while the edges 26 are rolled for loosening the dirt during the rotation of the modified form of the spade. The side edges of the blades 23 and 24 are substantially straight, so that when the spade is driven into the ground, it will cut a cylindrical hole, into which a blunt pole may be set. The blades 23 and 24 have dirt supporting blades 27 carried thereby which are identical in construction to the plates 10 and the free edges of which lie in close proximity to each other when in horizontal dirt lifting position, as shown in Fig. 5 of the drawings.

Having thus fully described the invention, what is claimed is:

1. A spade comprising, a blade; a shank extending from the blade; a dirt removing plate pivotally carried by the blade; and a stop element carried by the blade and adapted to contact with the dirt removing plate.

2. A spade comprising, a blade; a shank extending from the blade; a horizontally pivoted dirt removing element secured to the forward portion of the blade, said dirt removing element having its forward end portion thereof angularly disposed, whereby the upward movement of the blade will cause the dirt removing element to assume a horizontal position; and a stop element carried by the blade.

3. A spade comprising, a blade; a shank extending from the blade; the forward portion of said blade having a transversely extending pocket therein; a dirt removing element having its rear end portion rolled and arranged in said transversely extending pocket thereby effecting a pivotal connection with said blade; and a stop element carried by said blade and adapted to support the same when in a horizontal position.

4. A spade comprising, a blade having one edge thereof sharpened and one edge thereof rolled; a dirt removing element pivotally secured to the forward portion of said blade; said dirt removing element being adapted to be disposed in a vertical position upon the loosening of the dirt and adapted to assume a horizontal position upon the lifting of the blade; and a stop element carried by the blade and adapted to support the dirt removing element in a horizontal position upon the removal of the blade.

In testimony whereof I affix my signature in presence of two witnesses.

GEORGE W. FELTON.

Witnesses:
G. A. BAILEY,
CLYDE MCCAIN.